US009537128B2

(12) United States Patent
Sekine (10) Patent No.: US 9,537,128 B2
(45) Date of Patent: Jan. 3, 2017

(54) ASSEMBLED BATTERY

(71) Applicant: HITACHI VEHICLE ENERGY, LTD., Ibaraki (JP)

(72) Inventor: Atsushi Sekine, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/652,608

(22) PCT Filed: Dec. 28, 2012

(86) PCT No.: PCT/JP2012/084041
§ 371 (c)(1),
(2) Date: Jun. 16, 2015

(87) PCT Pub. No.: WO2014/103007
PCT Pub. Date: Jul. 3, 2014

(65) Prior Publication Data
US 2015/0333304 A1    Nov. 19, 2015

(51) Int. Cl.
*H01M 2/10*    (2006.01)
*H01M 10/625*   (2014.01)
(Continued)

(52) U.S. Cl.
CPC ......... *H01M 2/1077* (2013.01); *H01M 10/625* (2015.04); *H01M 10/647* (2015.04);
(Continued)

(58) Field of Classification Search
CPC ............ H01M 2/1077; H01M 10/6555; H01M 10/625; H01M 10/647; H01M 10/6557; H01M 2220/20
See application file for complete search history.

(56) References Cited

U.S. PATENT DOCUMENTS

2010/0167115 A1*  7/2010  Okada ................. H01M 2/1077
                                                    429/99
2011/0206948 A1*  8/2011  Asai ................... H01M 2/0473
                                                    429/7

(Continued)

FOREIGN PATENT DOCUMENTS

JP    2008-235149 A    10/2008
JP      2010-9962 A     1/2010
(Continued)

OTHER PUBLICATIONS

International Search Report (PCT/ISA/210) dated Feb. 19, 2013 with English translation (five pages).
(Continued)

*Primary Examiner* — Stewart Fraser
(74) *Attorney, Agent, or Firm* — Crowell & Moring LLP (57) ABSTRACT

The purpose of the present invention is to provide an assembled battery including a battery holder capable of holding single battery cells while automatically aligning the cells during assembly. In the assembled battery (100) according to the present invention, a plurality of single battery cells (101) arranged in a row and battery holders (144) disposed between the plurality of single battery cells (101) are held in a state of being mutually pressed in an arranged direction. The battery holders (144) include a positioning means (144f, 144g) that positions the single battery cells (101) by biasing the single battery cells (101), while being pressed in the arranged direction, in a direction intersecting the arranged direction.

5 Claims, 9 Drawing Sheets

(51) Int. Cl.
*H01M 10/647* (2014.01)
*H01M 10/6557* (2014.01)
*H01M 10/6555* (2014.01)

(52) U.S. Cl.
CPC ... *H01M 10/6555* (2015.04); *H01M 10/6557* (2015.04); *H01M 2220/20* (2013.01)

(56) References Cited

U.S. PATENT DOCUMENTS

2011/0244298 A1* 10/2011 Guener ............... H01M 2/1061
                                                                   429/120
2012/0141855 A1* 6/2012 Okada ................. H01M 2/1077
                                                                   429/99
2012/0315508 A1 12/2012 Kurita

FOREIGN PATENT DOCUMENTS

| JP | 2011-34775 A | 2/2011 |
| --- | --- | --- |
| JP | 2011-216424 A | 10/2011 |
| JP | 2012-64357 A | 3/2012 |
| JP | 2012-256467 A | 12/2012 |

OTHER PUBLICATIONS

Japanese-language Written Opinion (PCT/ISA/237) dated Feb. 19, 2013 (three pages).

* cited by examiner

ASSEMBLED BATTERY

TECHNICAL FIELD

The present invention relates to an assembled battery in which a plurality of secondary batteries, e.g., is held and electrically connected.

BACKGROUND ART

As a background technology for the present technical field, there is JP 2011-034775 A (Patent Literature 1). In this publication, it is described that "a separator includes an upper surface holding portion holding an upper surface, a pair of side surface holding portions holding side surfaces, and a lower surface holding portion holding a lower surface of square batteries, and an insulating portion extending between the square batteries. The lower surface holding portion, which is positioned on the cooling surface side, is formed with a cutout portion exposing surfaces of the square batteries on the cooling surface side except for a pair of corner portions in the surfaces on the cooling surface side of the square batteries. A heat-conducting sheet is abutted on a cooling surface of the assembled battery via the cutout portion, with a cooling plate abutted on the heat-conducting sheet (see the Abstract).

CITATION LIST

Patent Literature

Patent Literature 1: JP 2011-034775 A

SUMMARY OF INVENTION

Technical Problem

In an assembled battery, electrical connection is established by connecting electrodes of simile battery cells via busbars. The busbars and the battery electrodes are connected by welding for example.

When the assembled battery is assembled, it is necessary to align the electrode positions of the single battery cells in the welding step. After welding, it is also necessary to secure the single battery cells in place so as to prevent application of load to the weld locations.

In Patent Literature 1, because the single battery cell is fitted between the lower surface holding portion and the upper surface holding portion and between the pair of side surface holding portions, dimensional variation of the battery can cannot be absorbed. For example, when the dimension beta the pair of side surface holding portions is greater than the battery can of the single battery cell, a gap from the battery can will be produced in a cell width direction. As a result, the single battery cell cannot be held, and it becomes difficult to align the single battery cells during assembly. When the dimension between the pair of side surface holding portions is narrower than the battery can, the single battery cell cannot be fitted.

The present invention was made in view of the above, and an object of the present invention is to provide an assembled battery including a battery holder capable of holding single battery cells while the cells are automatically aligned during assembly.

Solution to Problem

In order to solve the problem, the configurations described in the claims are adopted, for example.

The present invention includes a plurality of means by which the problem is solved. An example is an assembled battery including a plurality of single battery cells arranged in a row; and a battery holder disposed between the plurality of single battery cells, the single battery cells and the battery holder being held in a state of being mutually pressed in an arranged direction. The battery holder includes a positioning means that positions the single battery cells by biasing the single battery cells, while being pressed in the arranged direction, in a direction intersecting the arranged direction,

Advantageous Effects of Invention

According to the present invention, single battery cells can be held while the cells are automatically aligned during assembly without increasing the number of components. Other problems, configurations, and effects will become apparent from the following description of embodiments.

DESCRIPTION OF EMBODIMENTS

Embodiments of the present invention will be described with reference to the drawings.

First Embodiment

In the present embodiment, an assembled battery 100 in which cooling is performed using cooling medium will be described.

Figure 1:
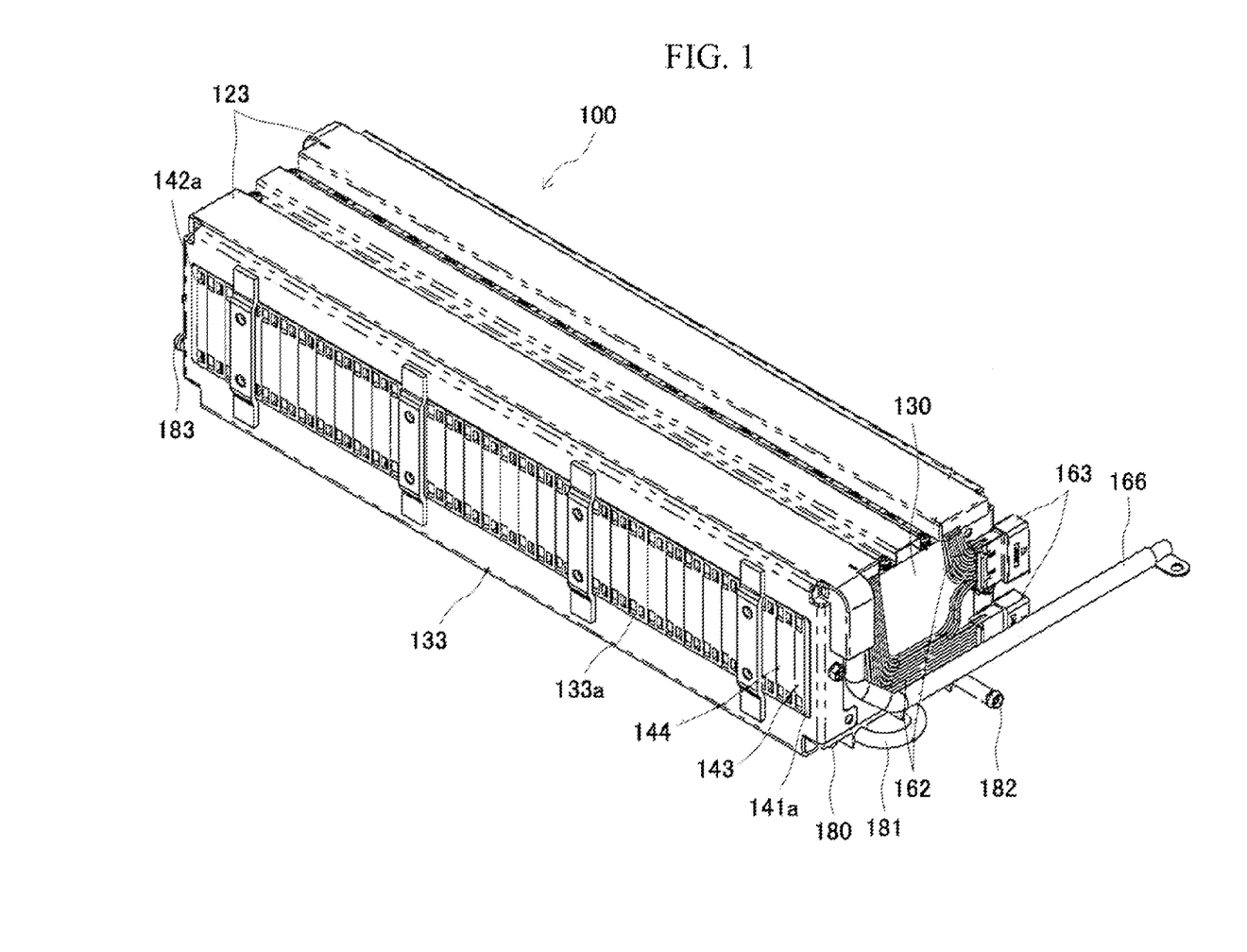
FIG. 1 is an exterior perspective view of an assembled battery according to a first embodiment.
Figure 2:
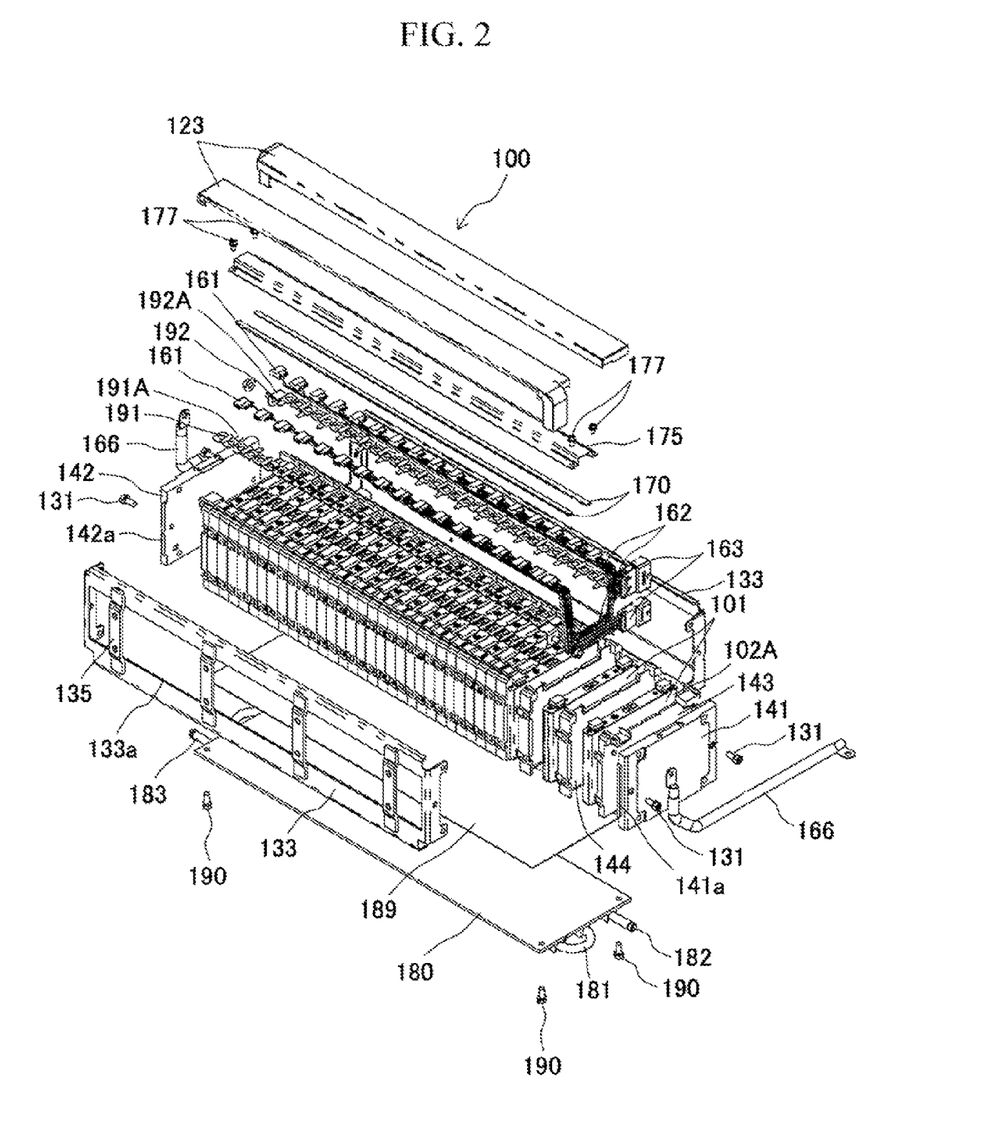
FIG. 2 is an exploded perspective view of the assembled battery of FIG. 1.

FIG. 1 is an exterior perspective view of the assembled battery according to the present embodiment. FIG. 2 is an exploded perspective view of the assembled battery shown in FIG. 1.

As shown in FIG. 1, the assembled battery 100 has a substantially cuboidal shape, and includes a plurality of single battery cells 101 held by an integration mechanism including end plates, battery holders, bolts and the like, as will be described later. To the assembled battery 100, an electric power cable 166 is attached for electric power output wiring.

As shown in FIG. 2, the assembled battery 100 includes a number of single battery cells 101. The single battery cells 101 are disposed side by side on a cooling plate 180 disposed on a lower surface of the assembled battery 100. Between the cooling plate 180 and the bottom surfaces of the single battery cells 101, a heat-conducting sheet 189 is placed. The single battery cells 101 are thermally coupled to the cooling plate 180 via the heat-conducting sheet 189.

The material of the cooling plate 180 is a material having excellent heat conductivity, such as aluminum. The material of the heat-conducting sheet 189 is a material having good heat conductivity and electrical insulating property, such as silicon rubber or acrylic rubber. As the heat-conducting sheet 189, it is preferable to adopt an insulating seat having a heat transfer rate on the order of 1 to 5 W/m·K, and a volume resistivity on the order of $10^{10}$ to $10^{11}$ Ω·cm.

The heat-conducting sheet 189 has adequate flexibility and adhesion, and is closely abutted on both the single battery cells 101 and the cooling plate 180 without any gap between the bottom surfaces of the single battery cells 101 and the cooling plate 180.

The cooling plate 180 is formed in a rectangular shape and provided with a cooling pipe 181 in which a cooling medium, such as aqueous solution of ethylene glycol or chlorofluorocarbon gas, flows.

The cooling pipe 181 is fitted with a hose or pipe and the like which is not shown, and the cooling plate 180 is connected to a refrigerant cooling system, which is not shown. The cooling medium is supplied from the refrigerant cooling system to an inlet portion 182 of the cooling pipe 181, caused to flow in the cooling pipe 181, discharged out of an outlet portion 183, and then collected back into the refrigerant cooling system.

The refrigerant cooling system, which is not shown, includes a pump or a compressor that causes the cooling medium to be circulated in the refrigerant cooling system; a tank with the role of a buffer for temporary storage of the cooling medium; and a radiator or condenser that cools the cooling; medium, having been warmed absorbing heat from the single battery cells 101, by exchanging heat with the atmosphere.

As shown, in the assembled battery 100, the plurality of single battery cells 101 disposed side by side is held by a pair of end plates 141 and 142 from both ends in arranged direction (the longitudinal direction of the assembled battery 100) via battery holders 143 and 144. The material of the end plates 141 and 142 may be aluminum, for example. The end plates 141 and 142 have a rectangular flat-plate shape corresponding to a principal plane of the single battery cells 101 (wider side surfaces PW of a battery can 102A). At both ends of the end plates 141 and 142 in their width direction, protrusions 141a and 142a are provided. The protrusions 141a and 142a are fitted in opening portions 133a of side plates 133 as will be described later.

As shown in FIG. 1 and FIG. 2, the plurality of battery holders 143 and 144 are disposed between the two end plates 141 and 142. The battery holders 144 are disposed between the single battery cells 101. The battery holders 143 are disposed between the single battery cells 101 disposed at both ends and the end plates 141 and 142. The material of the battery holders 143 and 144 may be a resin having insulating property, such as polypropylene, polyamide, polyetherimide polyphenylene sulfide, polyphthalamide, or polybutylene terephthalate.

Figure 3:
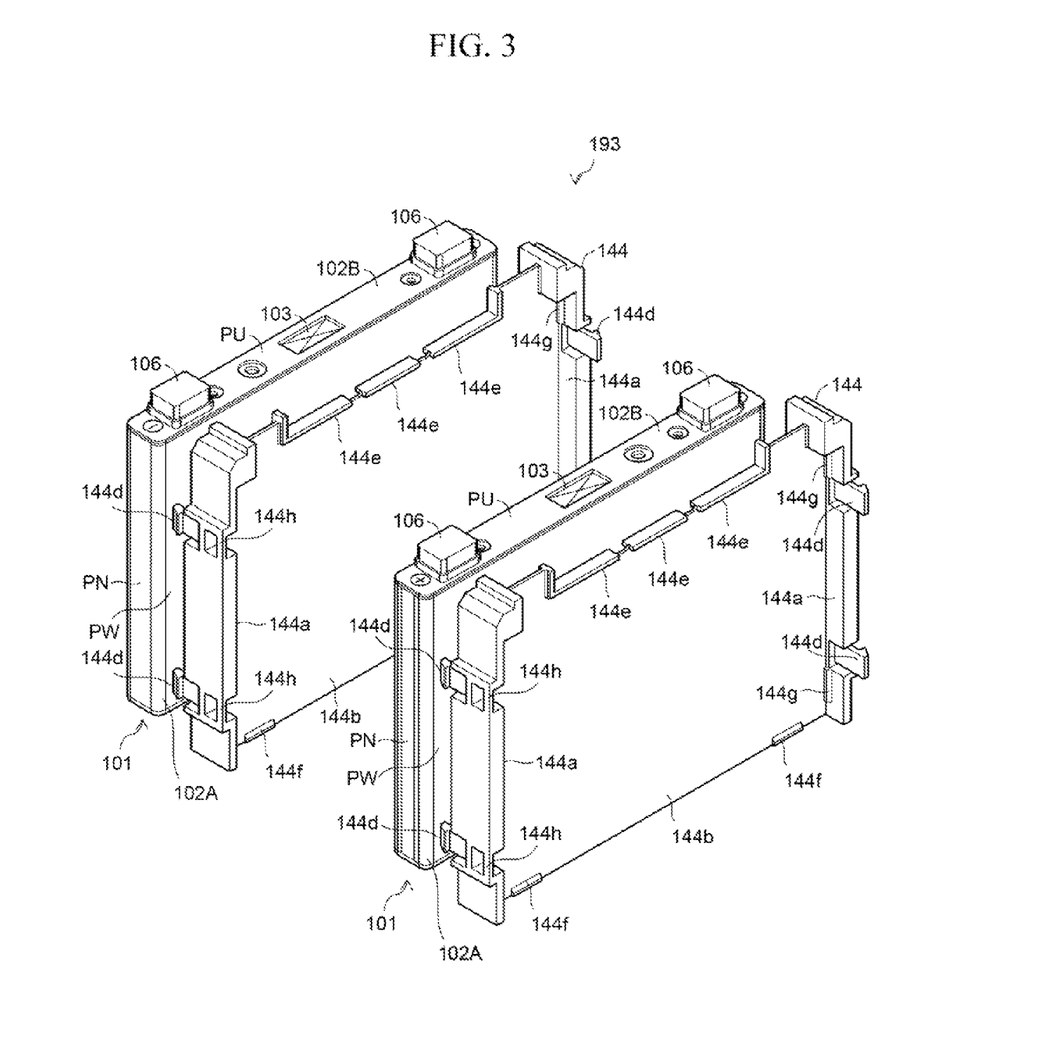
FIG. 3 is an exploded perspective view of a single battery cell assembly.

As shown in FIG. 3, the single battery cells 101 include a flat square battery can 102A. The battery can 102A is formed by deep drawing processing and includes an oblong bottom surface PB (see FIG. 5); a pair of wider side surfaces PW rising from the long sides of the bottom surface PB and facing each other across a space in a cell thickness direction; and a pair of narrower side surfaces PN rising from the short sides of the bottom surface PB and facing each other across a space in a cell width direction. At the top of the battery can 102A, an oblong opening portion is formed. The opening portion is closed by a battery lid 102B. At both sides of the battery lid 102B in the long side direction, electrodes 106 are disposed.

Figure 4:
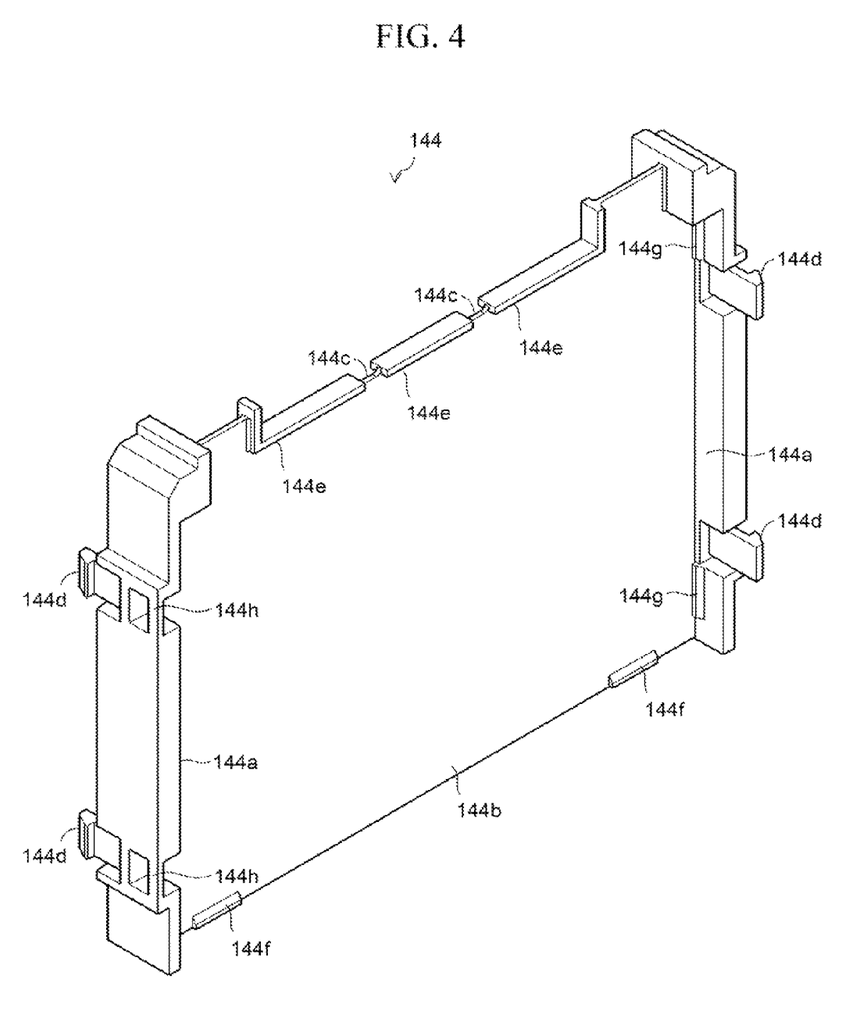
FIG. 4 is an exterior perspective view of a battery holder.

As shown in FIG. 3 and FIG. 4, the battery holders 143 and 144 include side surface abutting portions 144a that can abut against the narrower side surfaces PN of the single battery cells 101; upper surface abutting portions 144e that can abut against an upper surface PU of the single battery cells 101; and a wider side surface insulating portion 144b that is disposed between the single battery cells 101 and that can abut against the wider side surfaces PW of the battery can 102A. Lower end surfaces of the upper surface abutting portions 144e are positioned flush with the surface of the battery lid 102B of the single battery cells 101 (the upper surface PU of the single battery cells 101). Thus, upward movement, of the single battery cells 101 in the cell height direction is regulated by the abutment of the lower end surfaces on the single battery cells 101.

In both ends of the end plates 141 and 142, screw holes are formed. By mounting bolts 131 to the ends of the end plates 141 and 142 from outside the side plates 133, the side plates 133 can be secured to the end plates 141 and 142.

As shown in FIG. 1 and FIG. 2, the side plates 133 are disposed in a pair on both sides in the cell width direction along the arranged direction of the single battery cells 101, extending along the longitudinal direction of the assembled battery 100 on both left and right sides of the assembled battery 100. Each of the side plates 133 is provided with an opening portion 133a. By inserting the protrusions 141a and 142a of the end plates 141 and 142 into the opening portions 133a with the single battery cells 101 arranged between the end plates 141 and 142 via the battery holders 143 and 144 and compressed in the arranged direction by a predetermined amount of pressure, the components can be integrally held together.

In the present example, each Of the side plates 133 is provided with four brackets 135 secured by welding. The brackets 135 include screw holes for holding and securing the assembled battery 100 to a housing frame portion of a vehicle, not shown, or to a housing, not shown, storing a plurality of the assembled batteries 100.

Because the battery holders 143 and 144 are disposed between the single battery cells 101 and between the end plates 141 and 142 and the single battery cells 101, the relative positions of the single battery cells 101 with respect to the longitudinal and upper/lower directions of the assembled battery 100 can be defined while insulating property is ensured.

As shown in FIG. 2, the heat-conducting sheet 189 is disposed between the upper surface of the cooling plate 180 and the bottom surfaces of the battery cans 102A. The cooling plate 180 and the end plates 141 and 142 are fastened with bolts 190.

The battery holders 143 and 144 press the single battery cells 101 downward via the upper surface abutting portions 144e. As a result, the heat-conducting sheet 189, which has flexibility, is compressed by a predetermined amount, whereby the single battery cells 101 are thermally coupled to the cooling plate 180 via the heat-conducting sheet 189.

Over the single battery cells 101, there are disposed a busbar 191 connecting all of the single battery cells 101, and a terminal busbar 192 for obtaining electrical connection between the single battery cells 101 and the electric power cable 166.

The busbar 191 and the terminal busbar 192 include integrally formed tabs 191A and 192A with which voltage detection terminals 161 are fitted. The voltage detection terminals 161 are secured to electric wires 162 by crimping. The electric wires 162 are wired in the longitudinal direction of the assembled battery 100 and connected to relay connectors 163. Voltages between the single battery cells 101 are monitored by a voltage monitor unit (not shown) connected to the relay connectors 163.

Over the busbar 191, the terminal busbar 192, the voltage detection terminals 161, and the electric wires 162, a cover 123 formed from as resin material having insulating property is disposed. The covet 123 is for preventing entry of conductive foreign matter, such as water, dust, or oils, or composite material and the like. The cover 123 is attached in such a way as to cover the entire outer sides of the busbar 191, the terminal busbar 192, the voltage detection terminals 161, and the electric wires 162.

On the surface of the battery lid 102B of the single battery cells 101, gaskets 170 are affixed along groove portions 144$c$ (see FIG. 4) of the battery holders 143 and 144. The material of the gaskets 170 is a material having electrical insulating property and also adequate flexibility and adhesion, such as ethylene-propylene rubber, chloroprene rubber, or silicon rubber.

On the gaskets 170, a gas rail 175 formed in rectangular shape by pressing and the like is disposed. The material of the gas rail 175 is stainless steel or steel plate, for example, so that the gas rail can maintain its shape and ensure a gas discharge route even when high temperature gas is discharged as will be described later. The gas rail 175 is secured by threading small screws 177 into screw holes provided in end faces of the end plates 141 and 142. The gaskets 170 are held in a state of being compressed by a predetermined amount b the battery lids 102B and the gas rail 175.

At the center of the battery lid 102B, a gas discharge valve 103 (see FIG. 3) is formed. The gas discharge valve 103 disposed on the container surface of the single battery cells 101 is formed by partially thinning the battery lid 102B by pressing so as to relatively increase the degree of stress concentration upon application of internal pressure. Thus, when the pressure inside the battery can 102A reaches a predetermined pressure (such as approximately 1 MPa), the gas discharge valve 103 is preferentially destructed. As a result, high temperature gas is discharged upward outside the battery container, flows through the space enclosed by the is rail 175, the battery lid 102B, and the gaskets 170, and is then released via opening portions in the longitudinal direction of the assembled battery 100.

FIG. 3 is an exploded perspective view of a single battery cell assembly 193. FIG. 4 is a perspective view of the battery holders 144.

Herein, the battery holders 144 disposed between the single battery cells 101 will be described. The battery holders 143 disposed between the single battery cells 101 and the end plates 141 and 142 have substantially the same structure as that of the battery holders 144 on one side in the arranged direction. Thus, description of the battery holders 143 will be omitted.

The single battery cells 101 are each held by the side surface abutting portions 144$a$, the wider side surface insulating portions 144$b$, and the upper surface abutting portions 144$e$ of a pair of battery holders 144. The side surface abutting portions 144$a$ are integrally formed with fastener portions 144$d$ and locking hole portions 144$h$. The fastener portions 144$d$ are fastened and substantially secured to the locking portions 144$h$ of the paired battery holder 144.

The battery holders 144 include a positioning means for positioning the single battery cells 101 by biasing the single battery cells 101, while being pressed in the arranged direction, in an orthogonal direction which is a direction intersecting the arranged direction. The positioning means includes protrusion portions 144$f$ for positioning the single battery cells 101 in the cell height direction by biasing the single battery cells 101 upward in the cell height direction and protrusion portions 144$g$ for positioning the single battery cells 101 in the cell width direction by biasing the single battery cells 101 from one side to the other in the cell width direction.

Figure 5:
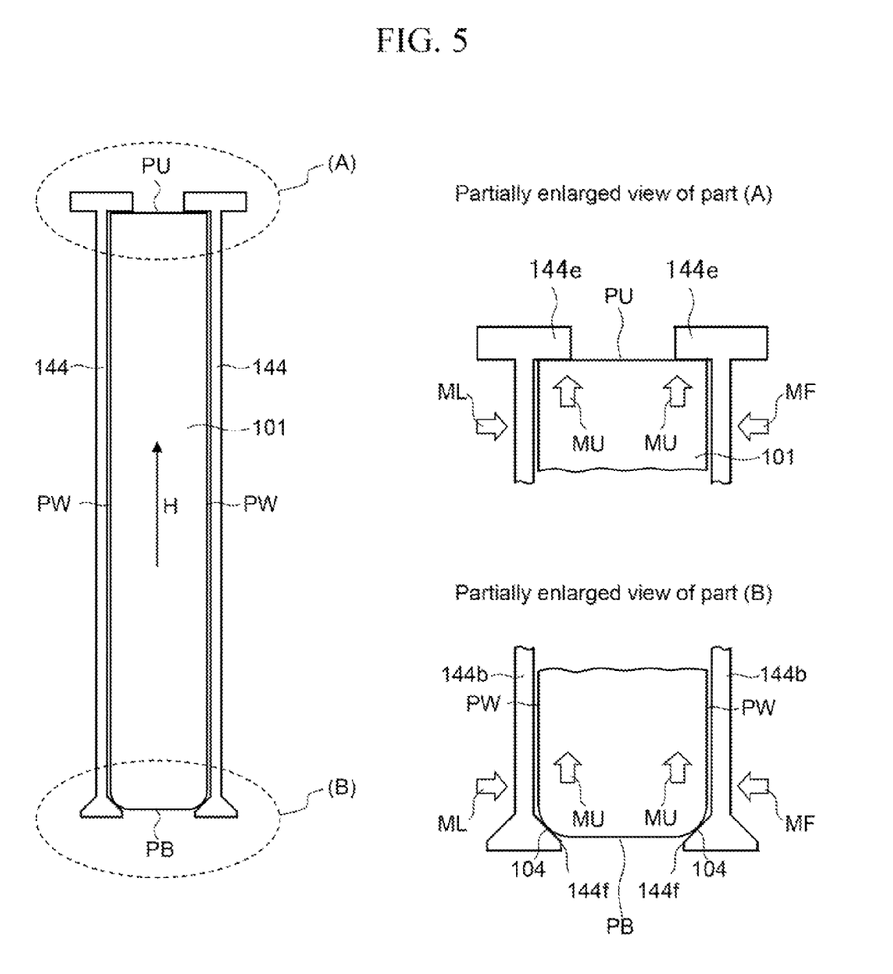
FIG. 5 is a vertical cross sectional view of as single battery cell assembly.

As shown in FIG. 5, the protrusion portions 144$f$ are integrally formed on front and rear surfaces at the lower ends of the wider side surface insulating portions 144$b$. The protrusion portions 144$f$ include inclined faces that, when the single battery cell 101 is held between a pair of battery holders 144, abut against corner portions 104 (corner portions 104 between the wider side surfaces PW and the bottom surface PB) disposed at the lower side in the cell height direction and on sides in the arranged direction of the battery can 102A, the inclined faces being inclined in directions intersecting the arranged direction. The inclined faces of the protrusion portions 144$f$ are inclined from bottom toward top of the battery holder 144 such that the inclined faces gradually transition downward as they protrude from the wider side surface insulating portions 144$b$. In the present embodiment, the inclined faces have an inclination angle of 45° with respect to the wider side surface insulating portions 144$b$.

The protrusion portions 144$f$ are dimensioned such that they can absorb dimensional tolerance of the battery can 102A in the cell height direction H. In other words, the protrusion portions 144$f$ are dimensioned and shaped such that the inclined faces of the protrusion portions 144$f$ can be abutted against the corner portions 104 whether the battery can 102A has the maximum value or the minimum value of its dimensional tolerance in the cell height direction.

The single battery cells 101 are biased upward in the cell height direction (the direction indicated by arrows MU in FIG. 5) as the battery holders 144 are pressed M the arranged direction (the direction indicated by arrow ML in FIG. 5) with the corner portions 104 of the battery can 102A abutting the inclined faces of the protrusion portions 144$f$. As the upper surface PU is pressed onto the upper surface abutting portions 144$e$, the single battery cells 101 are positioned in the cell height direction H with respect to the battery holders 144.

Figure 6:
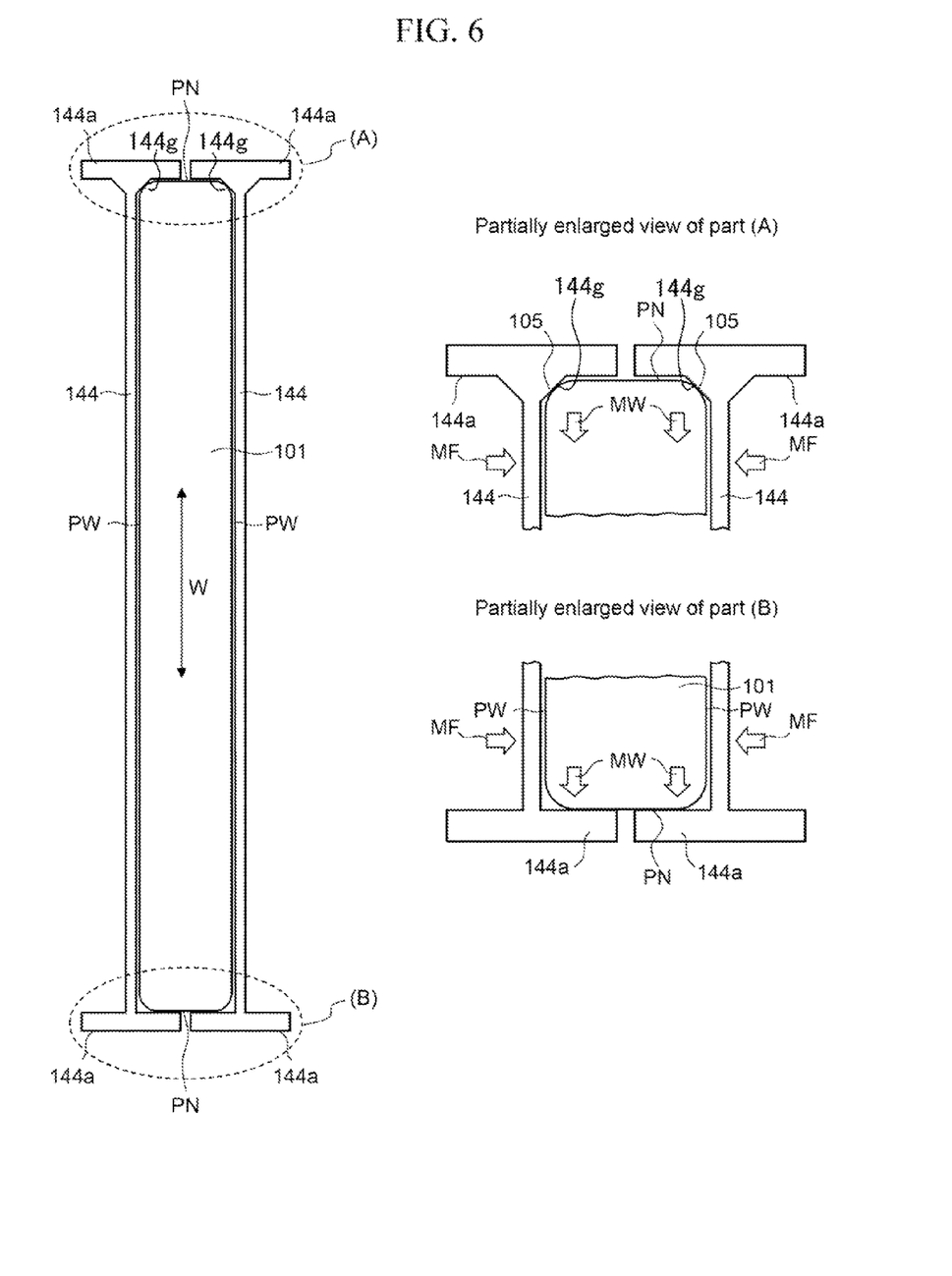
FIG. 6 is a lateral cross sectional view of the single battery cell assembly.

As shown in FIG. 6, the protrusion portions 144$g$ are provided by being integrally formed at the corner of the end at one side in the cell width direction of the wider side surface insulating portions 144$b$ on the front and rear surfaces thereof, and the side surface abutting portions 144$a$. The protrusion portions 144$g$ include inclined faces that, when the single battery cell 101 is held between a pair of battery holders 144, abut against corner portions 105 (the corner portions 105 between the wider side surfaces PW and the narrower side surfaces PN) disposed at one side in the cell width direction and on sides in the arranged direction of the wider side surfaces PW of the battery can 102A, the inclined faces being inclined in directions intersecting the arranged direction. The inclined faces of the protrusion portions 144$g$ are inclined from the side of the battery holder 144 toward the center in such a way as to gradually protrude from the wider side surface insulating portions 144$b$ as the inclined faces transition outward from the center in the cell width direction. In the present embodiment, the inclined faces have an inclination angle of 45° with respect to the wider side surface insulating portions 144$b$.

The protrusion portions 144g are dimensioned such that they can absorb the dimensional tolerance of the battery can 102A in the cell width direction W. In other words, the protrusion portions 144g are dimensioned and shaped such that the inclined faces of the protrusion portions 144g can be abutted against the corner portions 105 whether the battery can 102A has the maximum value or the minimum value of the dimensional tolerance in the cell width direction W.

The single battery cells 101 are biased toward one side in the cell width direction (the direction indicated by arrows MW in FIG. 6) as the battery holders 144 are pressed in the arranged direction the direction indicated by arrow ML in FIG. 6) with the corner portions 105 of the battery can 102A abutting the inclined faces of the protrusion portions 144g. As the narrower side surface PN at the one side in the cell width direction is pressed onto the side surface abutting portions 144a at the one side in the cell width direction, positioning in the cell width direction W is achieved.

In the present embodiment, the corner portions 104 and 105 of the battery can 102A are rounded by way of example. However, the corner portions may include an edge.

The battery holders 144 enable the single battery cells 101 to be positioned in the cell height direction by the protrusion portions 144f when the assembled battery 100 is assembled. Thus, dimensional variation of the battery can 102A can be absorbed, whereby the electrodes 106 of the single batteries 101 in the assembled battery 100 can be aligned at the same height position.

Thus, when a busbar is disposed across the electrodes 106 of the mutually adjacent single battery cells 101, and the electrodes 106 and the busbar are secured by welding, for example, the upper surfaces of the electrodes 106 and the lower surface of the busbar can be contacted to each other, enabling reliable welding. Further, because the single battery cells 101 are held and secured while the cell height position of the single battery cells 101 is positioned, the single battery cells 101 can be prevented from moving after welding, which would apply load to the weld locations.

In the present embodiment, in addition to the protrusion portions 144f, the protrusion portions 144g are provided. Thus, the single battery cells 101 can be positioned both in the cell height direction and the cell width direction. Through the positioning in the cell width direction by the protrusion portions 144g, dimensional variation of the battery can 102A can be absorbed, whereby the single batteries 101 in the assembled battery 100 can be aligned in a row in the arranged direction.

Thus, when the busbar is fastened to the electrodes 106 of the mutually adjacent single battery cells 101 using fastening bolts and nuts, for example, the busbar can be disposed at a preset fastening position and reliably fastened. Because the single battery cells 101 are secured with the cell height position of the single battery cells 101 having been positioned, the single battery cells 101 can be prevented from moving after fastening, which would apply load to the fastening locations.

While in the present embodiment the single battery cells 101 are positioned both in the cell height direction and the cell width direction by the protrusion portions 144f and 144g of the battery holder 144, the battery cells may be positioned in at least one of the directions.

According to the present embodiment, because the protrusion portions 144f and 144g are integrally formed with the battery holders 144, the single battery cells can be held while being automatically aligned dining assembly without an increase in the number of components.

In the assembled battery 100 having the above configuration, the battery holders 144 position the single battery cells 101 by having the single battery cells 101 while being pressed in the arranged direction abut against the protrusion portions 144f and 144g, thus biasing the cells in directions intersecting the arranged direction.

In contrast, the battery may be secured by having a part of a battery holding member elastically deformed, such as by elastically deforming ribs formed in the battery holder so as to absorb dimensional variation of the battery can and to align the single battery cells in one direction. In this method, however, because the battery holder is generally formed from an insulating material, such as a resin, the ribs as part of the battery holder may gradually lose their elastic force due to degradation over time, resulting in a decrease in holding force. Thus, when the assembled battery is mounted on a vehicle, for example, the single battery cells may be moved by vibrations to which the assembled battery may be subjected due to vibrations and the like of the vehicle. If the state in which the single battery cell holding force cannot be obtained continues, force may be applied to the busbar welded portions, i.e., electrical connection portions, damaging the welded portions.

The problem is addressed by the battery holder 144 of the assembled battery according to the present invention whereby the single battery cells 101 are abutted against the protrusion portions 144f and 144g and positioned by being biased in directions intersecting the arranged direction. Thus, the degradation over time is eliminated, enabling the single battery cells 101 to be secured with constant holding force. Accordingly, movement of the single battery cells 101 due to vibrations and the like of the vehicle can be suppressed, whereby the damage to the busbar welded portions can be prevented.

Second Embodiment

The present embodiment will be described with reference to FIG. 7 to FIG. 9.

In the present embodiment, an example of the assembled battery will be described in which cooling can be performed using not only refrigerant but also air. In the figures, constituent elements having the same functions as those of the first embodiment will be designated with reference numerals in the 200s instead of the 100s with the same numbers in the lower two digits. In the following, mainly differences from the first embodiment will be described.

Figure 7:
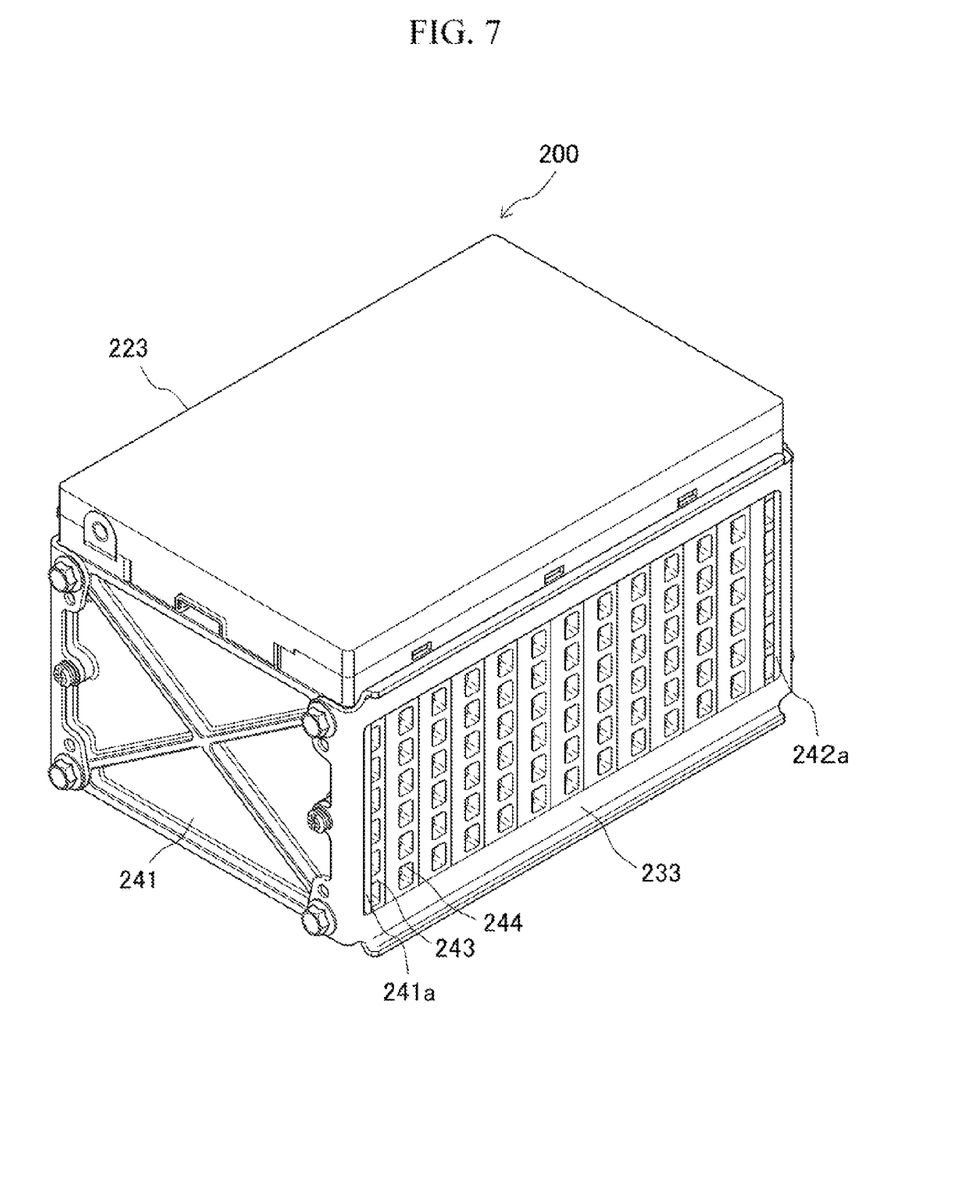
FIG. 7 is an exterior perspective view of the assembled battery according to a second embodiment.

FIG. 7 is an exterior perspective view of an assembled battery 200 according to the second embodiment. FIG. 8 is an exploded perspective view of the assembled battery shown in FIG. 7, FIG. 9 is an exterior perspective view of the battery holder.

As shown in FIG. 7, the assembled battery 200 has a substantially cuboidal shape in which a plurality of single battery cells is held by an integration mechanism including end plates, battery holders, bolts and the like.

As shown, the assembled battery 200 is assembled by holding the plurality of single battery cells 101, which are disposed side by side via battery holders 243 and 244, between a pair of end plates 241 and 242 from both ends in the arranged direction (the longitudinal direction of the assembled battery 200). The material of the end plates 241 and 242 is aluminum, for example. The end plates 241 and 242 have a rectangular flat-plate shape corresponding to the principal plane of the single battery cells 101. At both ends of the end plates 241 and 242 in the width direction, protrusions 241a and 242a are disposed. The protrusions 241a and 242a are fitted in opening portions 233a of side plates 233.

Figure 8:
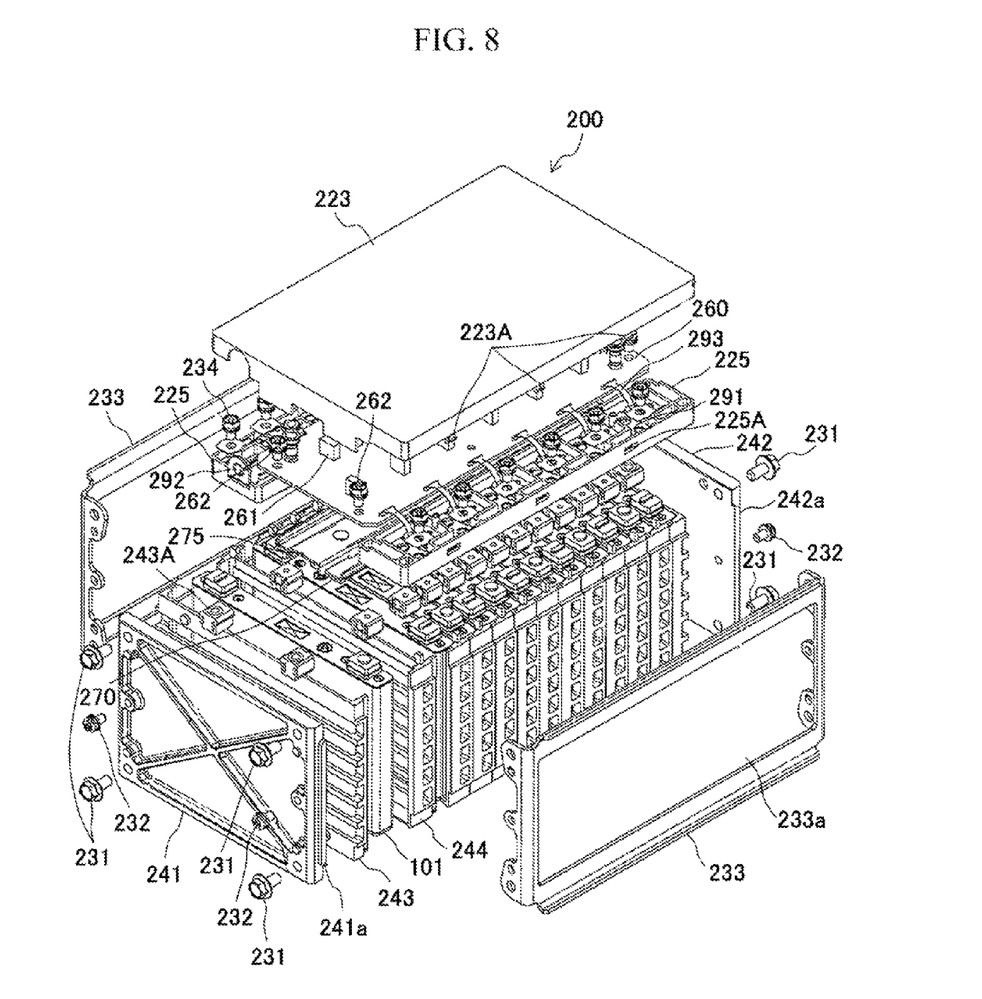
FIG. 8 is an exploded perspective view of the assembled battery of FIG. 7.

As shown in FIG. 7 and FIG. 8, between the two end plates 241 and 242, a plurality of battery holders 243 and 244 is disposed. The battery holders 244 are disposed between the single battery cells 101. The battery holders 243 are disposed between the single battery cells 101 disposed at both ends and the endplates 241 and 242. The material of the battery holders 243 and 244 is a resin having insulating property, such as polypropylene, polyamide, polyetherimide, polyphenylene sulfide, polyphthalamide or polybutylene terephthalate.

Figure 9:
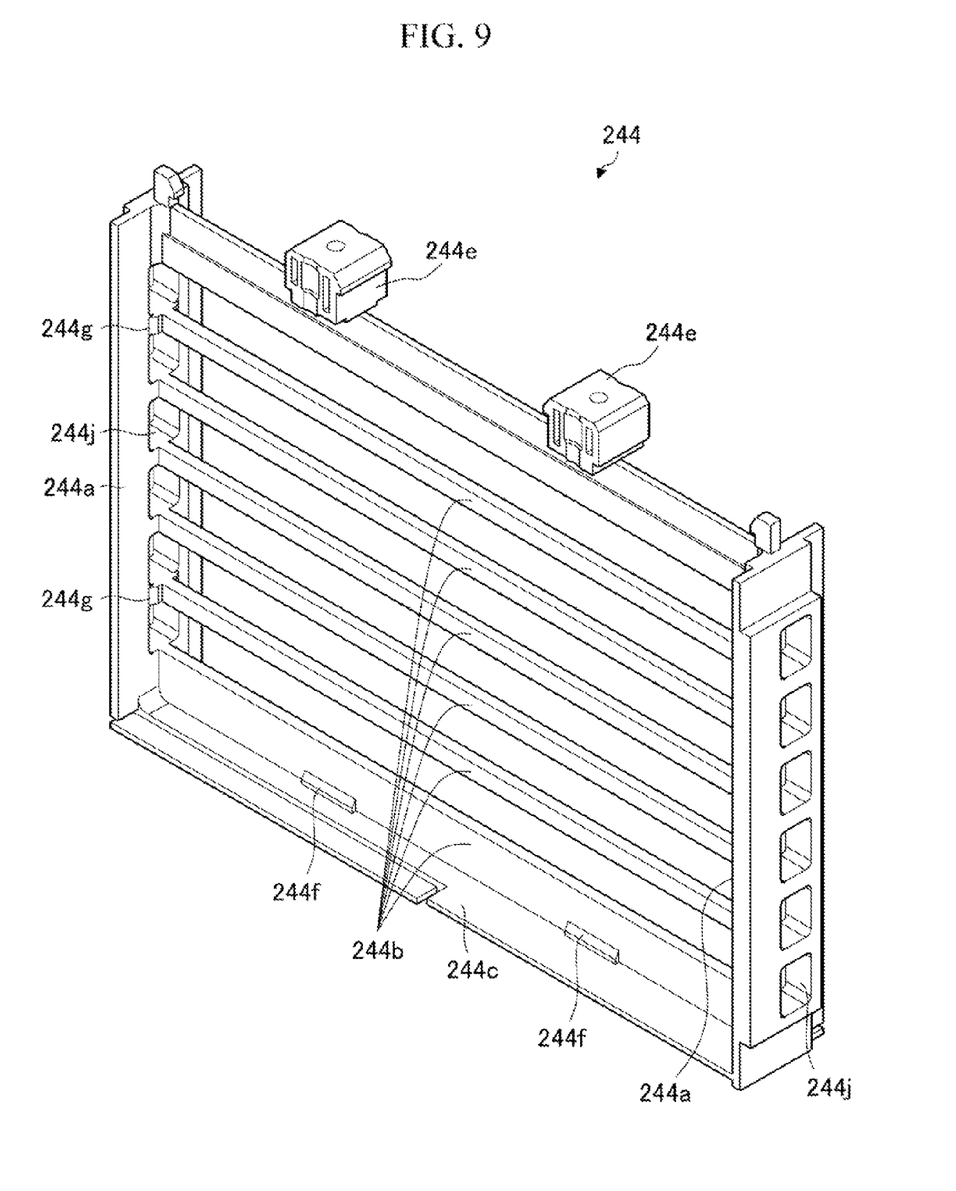
FIG. 9 is an exterior perspective view of the battery holder.

The battery holders 243 and 244, such as the battery holder 244 shown in FIG. 9, for example, include side surface abutting portions 244a that can be abutted against the narrower side surfaces PN of the single battery cells 101; upper surface abutting portions 244e that can be abutted against the upper surface PU of the single battery cells 101; wider side surface insulating portions 244b that are disposed between the single battery cells 101 and that can be abutted against the wider side surfaces PW of the single battery cells 101; and a bottom surface abutting portion 244e that can be abutted against the bottom surface PB of the battery can 102A of the single battery cells 101. Lower end surfaces of the upper surface abutting portions 244e are positioned flush with the surface of the battery lid 102B of the single battery cells 101 (the upper surface PU of the single battery cells 101) so that upward movement of the single battery cells 101 in the cell height direction can be regulated by the abutment of the lower end surfaces on the single battery cells 101.

At both ends of the end plates 241 and 242, screw holes are formed. By mounting bolts 231 and small screws 232 to the ends of the end plates 241 and 242, the two side plates 133 can be secured to the end plates 141 and 142.

As shown in FIG. 7 and FIG. 8, the side plates 233 are disposed in a pair on both sides in the cell width direction along the arranged direction of the single battery cells 101 and the battery holders 243. The side plates 233 respectively include opening portions 233a. By inserting the protrusions 241a and 242a of the end plates 241 and 242 into the opening portions 233a with the single battery cells 101 being arranged between the end plates 241 and 242 via the battery holders 243 and 244 and compressed by a predetermined amount by being pressed in the arranged direction, the end plates 241 and 242, the battery holders 243 and 244, and the single battery cells 101 can be prevented from being separated from each other in the arranged direction, and can be integrally held.

Because the battery holders 243 and 244 are disposed between the single battery cells 101 or between the end plates 24 and 242 and the single battery cells 101, insulating property can be ensured and the relative position of the single battery cells 101 in the longitudinal direction of the assembled battery 200 and the upper/lower direction of the assembled battery 200 can be defined.

As shown in FIG. 8, over the single battery cells 101, there are disposed a busbar 291 connecting all of the single battery cells 101 and a terminal busbar 292 for obtaining electrical connection between the single battery cells 101 and the electric power cable (not shown). Jumper plates 293 are connected to the busbar 291 and the terminal busbar 292 using bolts 234, with one ends connected to a substrate 260 by soldering.

The substrate 260 includes a wiring pattern formed thereon in advance. Voltages between the single battery cells 101 are monitored by a voltage monitor unit (not shown) via a fuse 261 connected to the pattern by soldering. The substrate 260 is secured to threaded portions 243A of the battery holders 243 using bolts 262. Over the busbar 291, terminal busbar 292 the jumper plate 293, the substrate 260, and the fuse 261, there is disposed as cover 223 formed from a resin material having insulating property. The cover 223 is for preventing entry of conductive foreign matter, such as water, dust, oils, or composite material. The cover 223 is attached in such as way as to cover the outer sides of the busbar 291, the terminal busbar 292, the jumper plate 293, the substrate 260, and the fuse 261 as a whole. Busbar holders 225 are disposed in such a way as to enclose the busbar 291 and the terminal busbar 292, with openings 225A provided in the busbar holders 225 locked With hook portions 223A of the cover 223.

On the upper surfaces of the battery lids 102B of the single battery cells 101, a gas rail 275 with a gasket 270 affixed thereto is disposed. The material of the gasket 270 is a material having, adequate flexibility and adhesion as well as electrical insulating property. Examples are ethylene-propylene rubber, chloroprene rubber, and silicon rubber.

On the gasket 270 is disposed the gas rail 275, which is formed in rectangular shape by pressing and the like. The material of the gas rail 275 is stainless or steel plate, for example, so that the gas rail 275 can maintain its shape and ensure a gas discharge route even when high temperature gas is discharged, as will be described later.

The gasket 270 is held in a state of being compressed by a predetermined amount by the battery lids 102B and the gas rail 275. At the center of the battery lids 102B, the gas discharge valves 103 are formed. The gas discharge valves 103 formed the container surface of the single battery cells 101 are formed by partially thinning the battery lids 102B by pressing such that the degree of stress concentration upon application of internal pressure becomes relatively high. Thus, when the pressure inside the battery can 102A reaches a predetermined pressure (such as approximately 1 MPa), the gas discharge valves 103 are preferentially destructed. As a result, the high temperature gas is discharged upward out of the battery container, flows through the space enclosed by the gas rail 275, the battery lids 102B, and the gasket 270, and is released out of opening portions of the assembled battery 200 in the longitudinal direction.

FIG. 9 is a perspective view of the battery holder 244. As shown in FIG. 7 and FIG. 8, between the two end plates 241 and 242, a plurality of battery holders 243 and 244 is disposed. The battery holders 244 are disposed between the single battery cells 101. The battery holders 243 are disposed between the single battery cells 101 disposed at both ends and the end plates 241 and 242.

Herein the battery holders 244 disposed between the single battery cells 101 will be described. Description of the battery holders 243 will be omitted as they have substantially identical structure to the structure of the battery holders 244 on one side in the arranged direction.

The single battery cells 101 are held by side surface abutting portions 244a, wider side surface insulating portions 244b, upper surface abutting portions 244e, and a bottom surface abutting portion 244c of a pair of battery holders 244. The side surface abutting portions 244a include air introduction/discharge openings 244j for cooling the wider side surfaces PW of the battery can 102A of the single battery cells 101. Air introduced by a cooling system which is not shown flows between the wider side surface insulating portions 244b of the battery holders 244 disposed between the single battery cells 101 so as to cool the single battery cells 101 by exchanging heat on the surface of the battery can 102A. In the bottom surface abutting portion 244c and a pair of the left and right side surface abutting portions 244a of the battery holders 244, stepped convex portions and stepped recess portions are respectively formed. The stepped recess portions are mated with the stepped convex portions of the paired battery holder 144, whereby the respective battery holders 244 are linked, forming continuous partition walls along the arranged direction.

The battery holders 244 include a positioning means for positioning the single battery cells 101 by biasing the single battery cells 101, while being pressed in the arranged direction, in a direction orthogonal to the arranged direction. The positioning means includes protrusion portions 244f for positioning the single battery cells 101 in the cell height direction by biasing the single battery cells 101 upward in the cell height direction, and protrusion portions 244g for positioning the single battery cells 101 in the cell width direction by biasing the single battery cells 101 toward one side in the cell width direction.

The protrusion portions 244f are provided by being integrally formed on the front and rear surfaces at the lower end of the wider side surface insulating portions 244b. The protrusion portions 244f include inclined faces that abut, when the single battery cell 101 is held between a pair of battery holders 244, against the corner portions 104 (the corner portions 104 between the wider side surfaces PW and the bottom surface PB) disposed at the lower side in the cell height direction and on sides in the arranged direction of the battery can 102A, the inclined faces being inclined in directions intersecting the arranged direction. The inclined faces of the protrusion portions 244f are inclined from bottom toward top of the battery holders 244 in such as way that the inclined faces gradually transition downward as they protrude from the wider side surface insulating portions 244b. In the present embodiment, the inclined faces have an inclination angle of 45° with respect to the wider side surface insulating portions 244b.

The protrusion portions 244f are dimensioned such that they can absorb dimensional tolerance of the battery can 102A in the cell height direction in other words, the protrusion portions 244f are dimensioned and shaped such that the inclined faces of the protrusion portions 244f can be abutted against the corner portions 104 whether the battery can 102A has the maximum value or the minimum value of the dimensional tolerance m the cell height direction.

The single battery cells 101 are biased upward in the cell height direction as the battery holders 244 are pressed in the arranged direction with the Cornet portions 104 of the battery can 102A being abutted against the inclined faces of the protrusion portions 244f. As the upper surface PU is pressed onto the upper surface abutting portions 244e, the single battery cells 101 are positioned in the cell height direction H with respect to the battery holders 244.

The protrusion portions 244g are provided by being integrally formed at the corner of the end at one side in the cell width direction of the wider side surface insulating portions 244b on the front and rear surfaces thereof, and the side surface abutting portions 244a. The protrusion portions 244g include inclined faces that are abutted, when the single battery cell 101 is held between a pair of battery holders 244, against the corner portions 105 disposed at one side in the cell width direction and on sides in the arranged direction of the wider side surfaces PW of the batter can 102A, the inclined faces being inclined in directions intersecting the arranged direction. The inclined faces of the protrusion portions 244g are inclined from the side of the battery holder 244 toward the center in such a way as to gradually protrude from the wider side surface insulating portions 244b as the inclined faces transition outward from the center in the cell width direction. In the present embodiment, the inclined faces have an inclination angle of 45° with respect to the wider side surface insulating portions 244b.

The protrusion portions 244g are dimensioned such that they can absorb the dimensional tolerance of the battery can 102A in the cell width direction W. In other words, the protrusion portions 244g are dimensioned and shaped such that the inclined faces of the protrusion portions 244g can be abutted against the corner portions 105 whether the battery can 102A has the maximum value or the minimum value of the dimensional tolerance in the cell width direction W.

The single battery cells 101 are biased toward one side in the cell width direction as the battery holders 244 are pressed in the arranged direction with the inclined faces of the protrusion portions 244g being abutted against the corner portions 105 of the battery can 102A. As the narrower side surface PN on the one side in the cell Width direction is pressed onto the side surface abutting portions 144a on the one side in the cell width direction, positioning in the cell width direction W is achieved.

According to the embodiment described above, operational effects similar to those of the assembled battery described with reference to the first embodiment can be achieved.

While the embodiments of the present invention have been described, the present invention is not limited to the foregoing embodiments, and various design modifications may be made without departing from the spirit of the present invention as set forth in the claims. The foregoing embodiments have been described for facilitating an understanding of the present invention, and are not necessarily limited to have all of the described configurations. For example, part of the configuration of one embodiment may be replaced with the configuration of another embodiment, or the configuration of the other embodiment may be incorporated into the configuration of the one embodiment. Further, with respect to part of the configuration of each embodiment, addition of another configuration, deletion, or substitution may be made.

REFERENCE SIGNS LIST

100 Assembled battery
101 Single battery cell
133 Side plate
141 End plate
144 Battery holder
133f, 144g Protrusion portion (positioning means)
161 Voltage detection terminal
162 Electric wire
163 Relay connector
166 Electric power cable
170 Gasket
175 Gas rail
180 Cooling plate
181 Cooling pipe
189 Heat-conducting sheet
191 Busbar
192 Terminal busbar

The invention claimed is:
1. An assembled battery comprising:
a plurality of single battery cells arranged in a row; and
a battery holder disposed between the plurality of single battery cells, the single battery cells and the battery holder being held in a state of being mutually pressed in an arranged direction, wherein the battery holder includes a positioning means that positions the single battery cells by biasing the single battery cells, while being pressed in the arranged direction, in a direction intersecting the arranged direction, wherein the single battery cells include a flat and square battery can, and wherein the positioning means includes an inclined face abutted against a corner portion disposed on a side in the arranged direction of the battery can, the inclined face being inclined in a direction intersecting the arranged direction.

2. The assembled battery according to claim 1, wherein the positioning means positions the single batteries in a cell height direction by biasing the battery can upward in the cell height direction.

3. The assembled battery according to claim 1, wherein the positioning means positions the single battery cells in a cell width direction by biasing the battery can from one side to another side in the cell width direction.

4. The assembled battery according to claim 1, wherein the inclined face is abutted against the corner portion positioned at a lower side in the cell height direction and on the side in the arranged direction of the battery can, and is inclined upward from under the battery holder.

5. The assembled battery according to claim 1, wherein the inclined face is abutted against the corner portion positioned at one side in the cell width direction and on the side in the arranged direction of the battery can, and is inclined from one side to another side in the cell width direction of the battery can.

* * * * *

UNITED STATES PATENT AND TRADEMARK OFFICE
CERTIFICATE OF CORRECTION

PATENT NO. : 9,537,128 B2  
APPLICATION NO. : 14/652608  
DATED : January 3, 2017  
INVENTOR(S) : Atsushi Sekine Page 1 of 1

It is certified that error appears in the above-identified patent and that said Letters Patent is hereby corrected as shown below:

On the Title Page

Column 1, item (71) should read:

(71) Applicant: Hitachi Automotive Systems, Ltd., Hitachinaka-shi (JP)

Signed and Sealed this  
Ninth Day of May, 2017

Michelle K. Lee  
*Director of the United States Patent and Trademark Office*